A. REVNY.
RAILROAD VELOCIPEDE.
APPLICATION FILED JAN. 13, 1922.

1,436,532.

Patented Nov. 21, 1922
2 SHEETS—SHEET 1.

Alexander Revny,
INVENTOR

BY Victor J. Evans
ATTORNEY

WITNESSES:

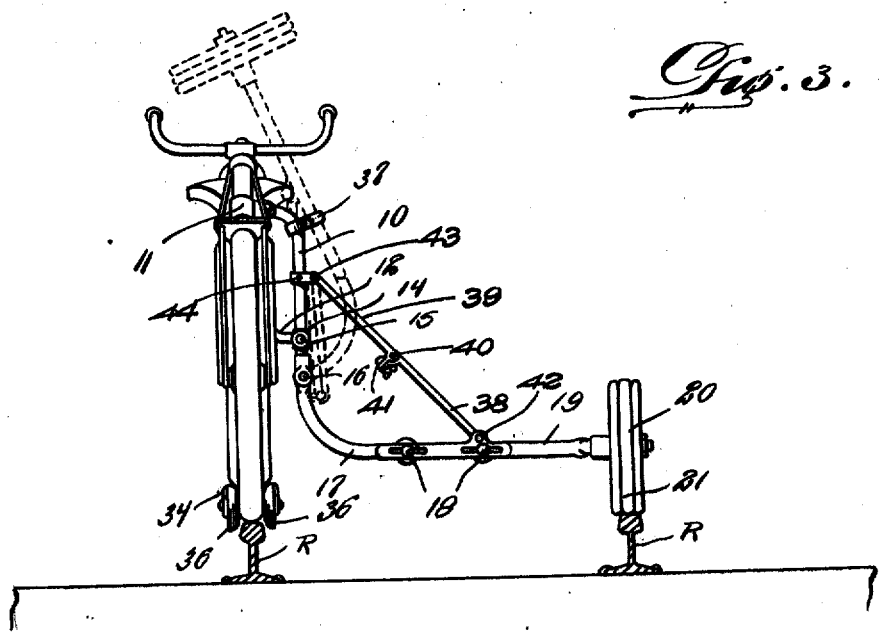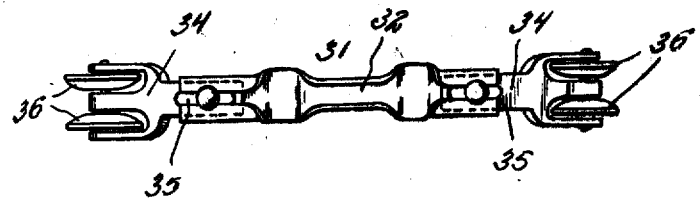

Patented Nov. 21, 1922.

1,436,532

UNITED STATES PATENT OFFICE.

ALEXANDER REVNY, OF VANCOUVER, BRITISH COLUMBIA, CANADA.

RAILROAD VELOCIPEDE.

Application filed January 13, 1922. Serial No. 529,059.

*To all whom it may concern:*

Be it known that I, ALEXANDER REVNY, a subject of the King of Great Britain, residing at Vancouver, in the Province of British Columbia and Dominion of Canada, have invented new and useful Improvements in Railroad Velocipedes, of which the following is a specification.

This invention relates to railroad velocipedes and has for an object the provision of means whereby an ordinary motorcycle may be converted into a railroad velocipede.

Another object of the invention is the provision of means which may be detachably secured to a motorcycle, whereby the latter may be ridden upon the rails of a railroad track, or upon the surface of the ground in the ordinary manner.

A further object is the provision of an attachment of this character which may be easily and quickly secured to or removed from a motorcycle or may be swung to and held in an out-of-the-way position, so that the motorcycle may be used for travel over the rails of a railroad track, or upon the ground in the ordinary manner without removing the attachment.

With the above and other objects in view, the invention further includes the following novel features and details of construction, to be hereinafter more fully described, illustrated in the accompanying drawings and pointed out in the appended claims.

In the drawings:—

Figure 1 is a side elevation of a motorcycle with the invention applied thereto and shown in position upon a railroad track.

Figure 2 is a plan view of the same.

Figure 3 is a front elevation.

Figure 4 is a plan view of the adjustable rail guide and carriage removed from the motorcycle.

Referring to the drawings in detail, wherein like characters of reference denote corresponding parts, the invention includes a frame which is adapted to be removably secured to the frame of an ordinary motorcycle. The removable frame extends laterally from one side of the motorcycle and includes a front vertically arranged bar 10 having one end secured between ears provided upon a split collar 11, the latter being engaged around the steering head of the motorcycle. The lower end of the bar 10 is held in rigid position through the medium of an arm 12. One end of this arm is carried by a collar 13 which is adjustable upon the frame of the motorcycle and the opposite end is provided with a collar 14 which receives the bar 10 and which is held in adjusted position upon the said bar by means of a set screw or equivalent fastening device 15. Pivotally secured to the lower extremity of the bar 10 as shown at 16, is one end of an outwardly and laterally extending arm 17. This last mentioned arm has adjustably secured thereto as shown at 18, the inner end of an axle 19. Mounted upon the outer end of this axle is a wheel 20, which is preferably provided with a plurality of tires 21. The tires 21 are preferably of compressible material and are arranged side by side and adapted to engage and travel over the head of one of the rails R of the railroad track.

Mounted upon the axle 19 adjacent the wheel 20 is a sleeve 22, which has pivotally secured thereto as shown at 23, one end of a rearwardly and inwardly extending, horizontally arranged frame member 24. Secured to this member 24 by means of fastening devices 25 is a member 26 which is adjustable relatively to the member 24 and for this purpose the last named member is provided with slots 27 through which the fastening devices 25 pass. The inner end of the member 26 is socketed for the reception of one end of an arm 28, whose opposite inner end is pivoted as shown at 29 to a collar 30. This collar is adjustable upon one member of the rear fork of the motorcycle frame and the pivot 29 is in line with the pivot 16, so that the frame just described may be moved pivotally upward to the position shown by the dotted lines in Figure 3. By this means the wheel 20 may be elevated so as to adapt the motorcycle for travel in the ordinary manner, or it may be lowered to the position shown in the drawings for use upon a railroad track.

For the purpose of guiding the motorcycle on the rail opposite that over which the wheel 20 travels, there is provided an adjustable rail guiding carriage 31, which is shown in detail in Figure 4 of the drawings. This adjustable rail guide and carriage comprises an attaching member which is of arcuate shape intermediate its ends as shown in Figure 1 of the drawings and it is transversely curved at 32 to receive the lower portion of the motorcycle frame, upon which it is held by means of U-bolts or other fastening devices 33. The extremities of the attaching member 31 have their opposite side edges bent inwardly to provide guides for the reception of oppositely extending arms 34. These arms are provided with elongated slots 35 for the passage of bolts carried by the extremities of the attaching member 31 so that the said arm may be adjusted to regulate the length of the carriage. The outer ends of the arms 34 carry spaced wheels or rollers 36, the opposed faces of which are inclined to engage opposite sides of the head of the rail. When in the full line position shown in the drawings the wheels of the carriage 31 will engage upon opposite sides of the rail and the wheel 20 will engage the head of the opposite rail so that the motorcycle will travel and be guided upon the track. When it is desired to use the motorcycle in the ordinary manner, the laterally extending frame is elevated to the position shown in Figure 3 by the dotted lines and is held in this position by means of a spring clip 37 which engages the front portion of the pivoted frame. When used in the ordinary manner, the arms 34 are adjusted inward so as to raise the wheels or rollers 36 out of contact with the ground.

The arm 17 is rigidly held in adjusted position by means of a brace which is formed of sections 38 and 39, pivotally connected together as at 40, the sections being held against relative pivotal movement by means of a bolt 41 which passes through apertured ears provided in each of the sections. The section 28 is pivotally connected as at 42 to the axle 19 which extends from the arm 17, while the opposite end of the section 39 is pivotally secured as at 43, to a collar 44 which is adjustably mounted upon the front vertically arranged bar 10. The axle 19 may thus be held rigid in the position shown in full lines in the drawings, while the sections 38 and 39 of the brace may be broken or moved pivotally to permit the wheel 20 to swing to the position shown by the dotted lines in Figure 3.

The invention is susceptible of various changes in its form, proportions and minor details of construction and the right is herein reserved to make such changes as properly fall within the scope of the appended claims.

Having described the invention what is claimed is:—

1. The combination with a motorcycle, of a frame, means for securing said frame to one side of the motorcycle, a wheel mounted in a bearing provided at the outer end of said frame, a wheel carrying guide member detachably secured to the motorcycle frame between the front and rear wheels of the motorcycle and means whereby the wheels of the guide member may be elevated.

2. The combination with a motorcycle, of a frame, means for securing said frame to one side of the motorcycle, a wheel mounted in a bearing provided at the outer end of said frame, and a wheel carrying guide member detachably secured to the motorcycle frame between the front and rear wheels of the motorcycle, said guide member comprising an intermediate curved portion, wheel carrying arms located at each end thereof and means for adjustably securing the wheel carrying arms to the curved portion, whereby said arms may be raised or lowered.

In testimony whereof I affix my signature.

ALEXANDER REVNY.